(12) United States Patent
Okamoto

(10) Patent No.: US 6,975,044 B2
(45) Date of Patent: Dec. 13, 2005

(54) GENERATOR

(75) Inventor: Tetsuo Okamoto, Kitauwagun (JP)

(73) Assignee: Isao Takahashi, Hokkaido (JP)

( * ) Notice: Subject to any disclaimer, the term of this patent is extended or adjusted under 35 U.S.C. 154(b) by 0 days.

(21) Appl. No.: 11/064,466

(22) Filed: Feb. 22, 2005

(65) Prior Publication Data
US 2005/0140234 A1 Jun. 30, 2005

Related U.S. Application Data

(63) Continuation of application No. PCT/JP02/13346, filed on Dec. 20, 2002.

(51) Int. Cl.⁷ .............................................. H02K 21/24
(52) U.S. Cl. ................. 290/1 R; 310/156.32; 310/68 R
(58) Field of Search ........................... 290/1 R, 44, 55; 322/5, 6; 310/156.32–156.37, 268

(56) References Cited

U.S. PATENT DOCUMENTS

| | | | |
|---|---|---|---|
| 5,079,461 A * | 1/1992 | Schluter et al. ........... | 310/67 A |
| 5,334,898 A * | 8/1994 | Skybyk ...................... | 310/268 |
| 5,982,074 A * | 11/1999 | Smith et al. ................ | 310/261 |
| 6,611,078 B1 * | 8/2003 | Durham et al. ............. | 310/254 |

FOREIGN PATENT DOCUMENTS

| | | | | |
|---|---|---|---|---|
| CA | 2 260 039 | | 1/1998 | ............ H02K 3/28 |
| DE | 4223836 A1 * | | 1/1994 | |
| DE | 10053400 A1 * | | 5/2002 | |
| EP | 429729 A1 * | | 6/1991 | |
| GB | 2360140 A * | | 9/2001 | |
| JP | 53-8883 | | 1/1978 | .......... B23Q 41/00 |
| JP | 54-54218 | | 4/1979 | .......... H02K 21/24 |
| JP | 54054218 A * | | 4/1979 | |
| JP | 57160357 A * | | 10/1982 | |
| JP | 62233054 A * | | 10/1987 | |
| JP | 4-54853 | | 2/1992 | .......... H02K 21/24 |
| JP | 5-83997 | | 4/1993 | ............. H02P 9/00 |
| JP | 10052017 A * | | 2/1998 | |
| JP | 10-108427 | | 4/1998 | .......... H02K 21/22 |
| JP | 11196558 A * | | 7/1999 | |
| JP | 2000-236698 | | 8/2000 | ............. H02P 9/00 |
| JP | 2001145316 A * | | 5/2005 | |
| WO | 3003546 A1 * | | 1/2003 | |

* cited by examiner

*Primary Examiner*—Burton Mullins
(74) *Attorney, Agent, or Firm*—Jordan and Hamburg LLP

(57) ABSTRACT

A generator is provided comprising a driving shaft (1) rotated by an external driving force, a first rotator disk (5L) mounted to the driving shaft (1) and having a magnetic pole face thereof provided with N poles and S poles of permanent magnets (6NL and 6SL), a second rotator disk (5R) mounted to the driving shaft (1) to be distanced from the first rotator disk (5L) and having a magnetic pole face thereof provided with permanent magnets (6NR and 6SR) facing the magnetic pole face of the first rotator disk (5L), and a stator (10) having a group of first windings (L1 to L6) and a group of second windings (L7 to L12) mounted on a ring core (11) thereof which is disposed between the first rotator disk (5L) and the second rotator disk (5R). This can improve the efficiency of power generation and the efficiency of heat radiation.

2 Claims, 3 Drawing Sheets

GENERATOR

FIELD OF THE INVENTION

The present invention relates to a generator and particularly to a power generating apparatus where the permanent magnets are rotated by an external driving force for generating electric power at higher efficiency and with improvement of heat radiation.

BACKGROUND OF THE INVENTION

A conventional generator for generating electric power with its permanent magnets rotated by an external driving force has its permanent magnets arranged of a drum shape.

However, such conventional generator has a problem that an efficiency of the power generation is low by reasons, for example a rotator with the drum shape permanent magnets is heavy and so on. It has another problem that an efficiency of heat radiation is low because of the rotator with the drum shaped permanent magnets and a stator with windings are coaxially arranged.

Hence, an object of the present invention is to provide a generator there the permanent magnets are rotated by an external driving force for generating electric power at higher efficiency and with improvement of heat radiation.

SUMMARY OF THE INVENTION

As a first aspect of the present invention, a generator (100) is provided comprising: a driving shaft (1) rotated by an external driving force; a first rotator disk (5L) mounted to the driving shaft (1) and having a magnetic pole faces thereof provided with N poles and S poles of permanent magnets (6NL and 6SL); a second rotator disk (5R) mounted to the driving shaft (1) to be distanced from the first rotator disk (5L) and having a magnetic pole face thereof provided with permanent magnets (6NR and 6SR) facing the magnetic pole face of the first rotator disk (5L); and a stator (10) having a group of first windings (L1 to L6) and a grog of second windings (L7 to L12) mounted on a ring core (11) thereof which is disposed between the first rotator disk (5L) and the second rotator disk (5R).

The generator (100) of the first aspect has the first rotator disk (5L) and the second rotator disk (5R) arranged of a disk shape thus decreasing the weight of the rotator. Also, since the windings on the ring core to be supplied with load currents are arranged of a toroidal type, their generating magnetic flux can hardly be leaked out, thus creating no effect of electromagnetic braking. As a result, the efficiency of the power generation can be improved. Moreover as the first rotator disk (5L) and the second rotator disk (5R) are arranged to sandwich the stator (10) and an allocation of magnetic poles at the magnetic pole face of the first rotator disk (5L) and an allocation of magnetic poles at the magnetic pole face of the second rotator disk (5R) facing the magnetic pole face of the first rotator disk (5L) are identical to each other, a direction of an electromotive force generated at a portion of the windings facing to the magnetic face of the first rotator disk (5L) and a direction of an electromotive force generated at a portion of the windings facing to the magnetic face of the second rotator disk (5R) are additional thus increasing the efficiency of the power generation. Furthermore, as the rotator with the disk shaped permanent magnets and the stator are arranged to face each other like parallel planes, not like coaxial cylinders, their efficiency of heat radiation can be improved.

As a second aspect of the present invention, the generator (100) is provided in which the first windings (L1 to L6) is comprising 6 windings (L1 to L6) which are connected in series via diodes (D1 to D5) and the second windings (L7 to L12) is comprising 6 windings (L7 to L12) which are connected in series via diodes (D7 to D11).

The generator (100) of the second aspect allows the diodes (D1 to D12) to release a direct current output.

As a third aspect of the present invention, the generator (100) is provided in which condensing circuits (H1 to H5, H7 to H11) are disposed corresponding with the diodes (D1 to D5 and D7 to D12) and charged through their respective diodes (D1 to D5 and D7 to D12).

The generator (100) of the third aspect can output a high DC voltage produced by addition of charged voltages of the condensing circuits (H1 to H5) and a high DC voltage produced by addition of charged voltages of the condensing circuits (H7 to H11).

As a fourth aspect of the present invention, the generator (100) is provided in which a switching circuit (12, 13, 14, T1, and T2) is provided for releasing an output from the first windings (L1 to L6) on a duration when current flows in the diodes (D1 to D5) of the first windings (L1 to L6) and releasing an output from the second windings (L7 to L12) on a duration when current flows in the diodes (D7 to D11) of the second windings (L7 to L12).

The generator (100) of the fourth aspect allows the first windings (L1 to L6) and the second windings (L7 to L12) separately because the switching circuit (12, 13, 14, T1, and T2) switches between the duration of releasing an output from the first windings (L1 to L6) and the duration of releasing an output from the second windings (L7 to L12).

As a fifth aspect of the present invention, a generator is provided comprising: a driving shaft rotated by an external driving force; a rotator disk mounted to the driving shaft and having a magnetic pole face thereof provided with an m number of N poles and an m number of S poles of permanent magnets arranged alternately; and a stator having a group of first to 2m-th windings mounted on a ring core thereof which is disposed to face the magnetic pole face of the rotator disk.

The generator of the fifth aspect allows high efficiency of the power generation by some reasons, for example the rotator disk arranged of a disk shape decreasing the weight of the rotator and so on. Also, as the rotator with the disk shaped permanent magnets and the stator windings are arranged to face each other like parallel planes, not like coaxial cylinders, an efficiency of heat radiation can be improved.

As a sixth aspect of the present invention, a generator is provided comprising: a driving shaft rotated by an external driving force; a first rotator disk mounted to the driving shaft and having a magnetic pole face thereof provided with an m number of N poles and an m number of S poles of permanent magnets arranged alternately; a second rotator disk mounted to the driving shaft to be spaced from the first rotator disk and having a magnetic pole face thereof provided with permanent magnets which are arranged to face the magnetic pole face of the first rotator disk; and a stator having a group of first to 2m-th windings mounted on a ring core thereof which is disposed between the first rotator disk and the second rotator disk.

The generator of the sixth aspect has both the first rotator disk and the second rotator disk arranged of a disk shape thus decreasing the weight. Also, as the windings on the ring core to be supplied with load currents are arranged of a toroidal type, its generating magnetic flux can hardly be leaked out, thus creating no effect of electromagnetic braking. As a result, the efficiency of the power generation can be improved. As the first rotator disk and the second rotator disk are arranged to sandwich the stator and an allocation of magnetic poles at the magnetic pole face of the first rotator disk and an allocation of magnetic poles at the magnetic pole face of the second rotator disk facing the magnetic pole face of the first rotator disk are identical to each other, a direction of an electromotive force generated at a portion of the windings facing to the magnetic face of the first rotator disk and a direction of an electromotive force generated at a portion of the windings facing to the magnetic face of the second rotator disk are additional thus increasing the efficiency of the power generation. Furthermore, as the rotator with the disk shaped permanent magnets and the stator are arranged to face each other like parallel planes, not like coaxial cylinders, their efficiency of heat radiation can be improved.

As a seventh aspect of the present invention, the generator is provided in which the number i (=1 to 2 m) windings is comprised of a plural of windings connected in series via diodes.

The generator of the seventh aspect allows a DC output by the diodes.

As an eighth aspect of the present invention, the generator is provided in which condensing circuits are disposed corresponding with the diodes and charged through their respective diodes.

The generator of the eighth aspect can output a high DC voltage produced by addition of charged voltages of the condensing circuits.

As a ninth aspect of the present invention, the generator is provided in which a switching circuit is provided for releasing an output from the number i winding on a duration when current flows in the diodes of the number i winding.

The generator of the ninth aspect allows for releasing an output from the 1st winding to m-th winding separately because the switching circuit switches the duration of releasing an output from the number i winding.

BEST MODES FOR EMBODYING THE INVENTION

The present invention win be described in more detail referring to embodiments illustrated. The present invention is not limited to the embodiments.

First Embodiment

Figure 1:
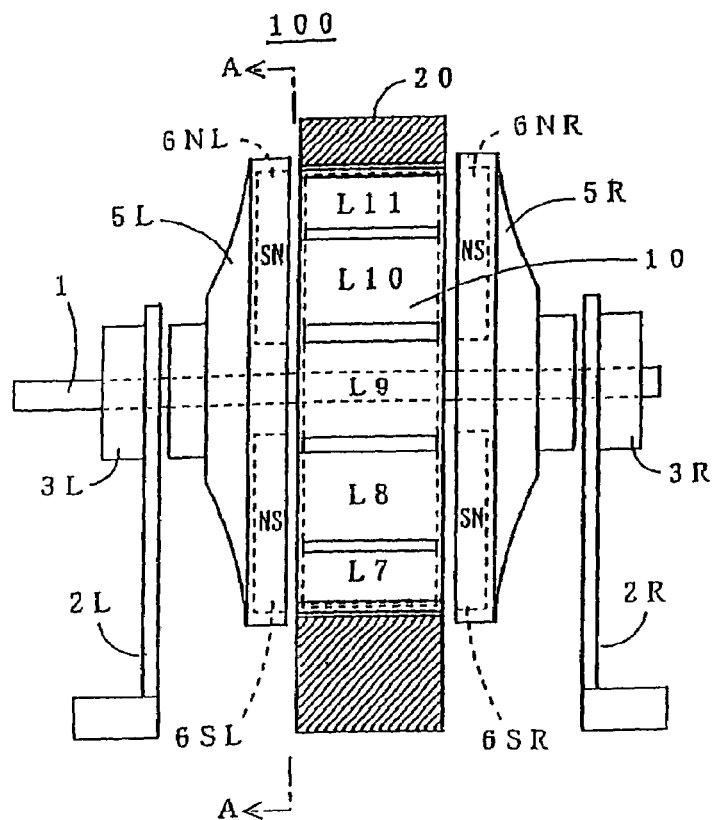
FIG. 1 is a front view of a generator showing a first embodiment of the present invention.

FIG. 1 is a schematic view of a generator (100) according to the first embodiment of the present invention.

The generator (100) comprises a driving shaft (1) driven by the rotating force of an external source such as a motor, an engine, a turbine, a water-driven wheel, or a wind-driven wheel, a left rotator disk (5L) arranged integral with the driving shaft (1), a right rotator disk (5R) arranged integral with the driving shaft (1) as spaced front the left rotator disk (5L), and a stator (10) accommodated in a stator case (20) provided between the left rotator disk (5L) and the right rotator disk (5R).

The driving shaft (1) extends across the center hole of the rotator (10) and is rotatably supported by a left support (2L) and a left bearing (3L) at the left and by a right support (2R) and a right bearing (3R) at the right.

Figure 2:
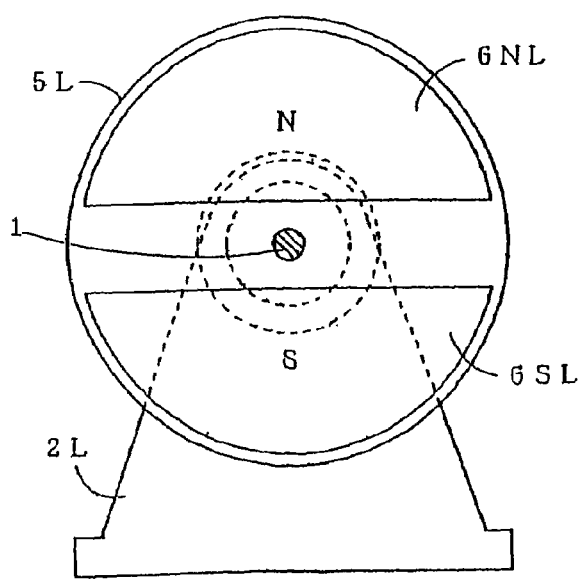
FIG. 2 is a side view of a left stator disk in the generator of the first embodiment.

As shown in FIG. 2, a permanent magnet (6NL) magnetized in the direction facing to the stator (10) and of a semi-circular shape is bonded on the left rotator disk (5L) with its N pole facing the stator (10). Also, another permanent magnet (6SL) magnetized in the direction facing to the stator (10) and of a semi-circular shape is bonded thereto with its S pole facing the stator (10).

Similarly, a permanent magnet (6NR) magnetized in the direction facing to the stator (10) and of a semi-circular shape is bonded on the right rotator disk (5R) with its N pole facing the stator (10). Also, another permanent magnet (6SR) magnetized in the direction facing to the stator (10) and of a semi-circular shape is bonded thereto with its S pole facing the stator (10).

Figure 3:
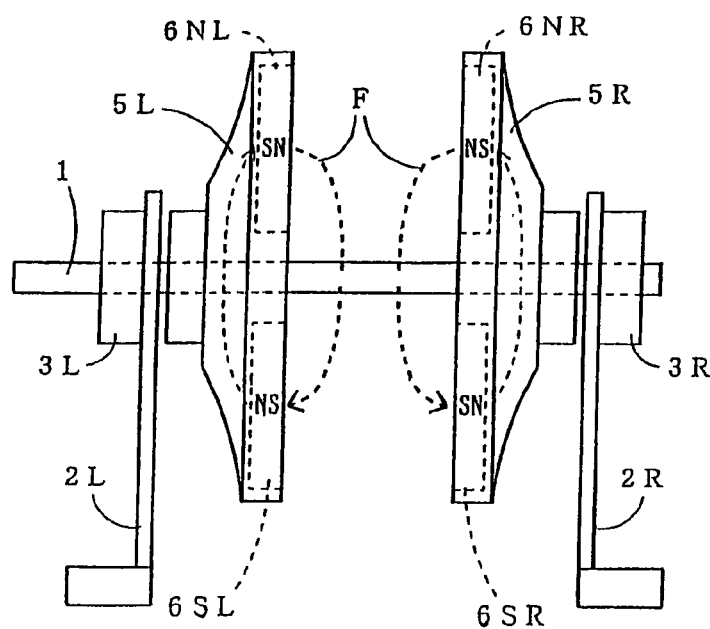
FIG. 3 is a front view of the stator disks in the generator of the first embodiment.

As shown in FIG. 3, the left rotator disk (5L) and the right rotator disk (5R) are made of a lower magnetic resistance material (such as iron) for a magnetic path.

Figure 4A:
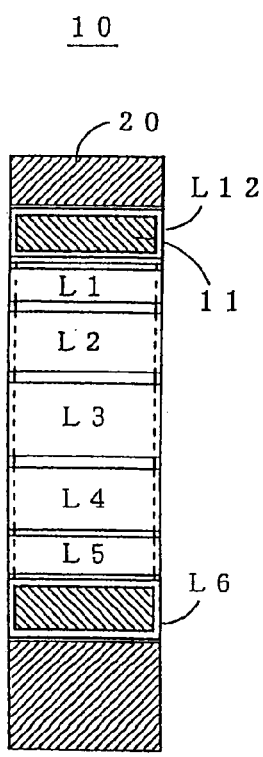
FIG. 4 illustrates a cross sectional front view and a side view of a stator in the generator of the first embodiment.
Figure 4B:
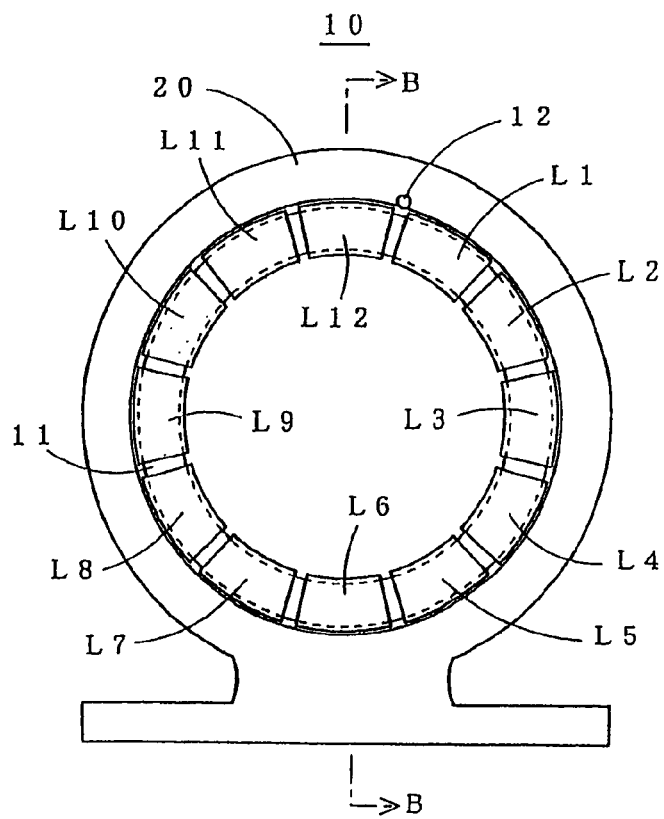

As shown in FIG. 4, the stator (10) has winding (L1) to winding (L12) wound as toroidal coils at equal intervals of an angle on a ring core (11). A Hall sensor (12) is provided between the winding (L12) and the winding (L1).

Figure 5:
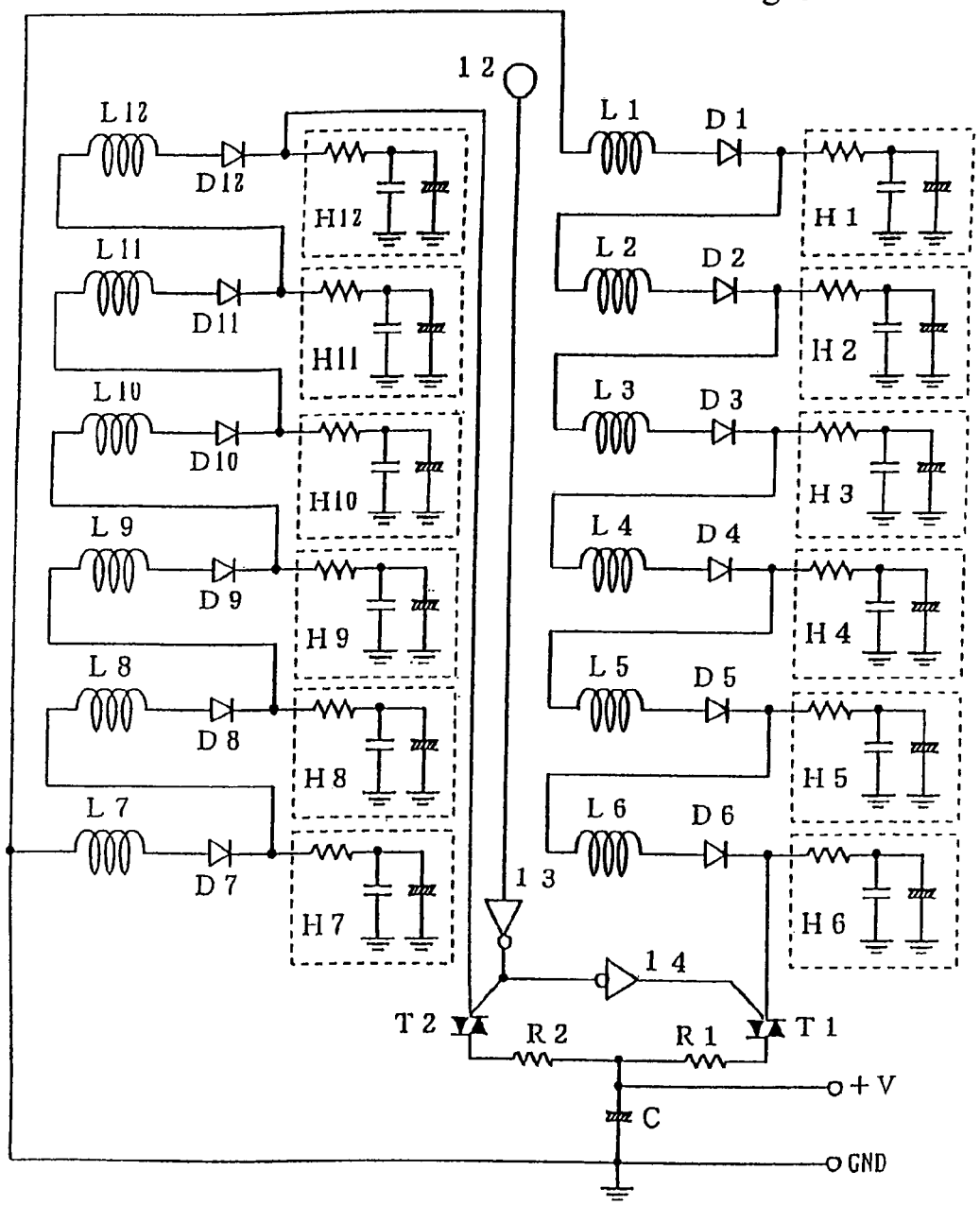
FIG. 5 is a circuitry diagram showing electrical connections in the generator of the first embodiment.

FIG. 5 is a circuitry diagram showing electrical connections in the generator (100) of the first embodiment.

The winding (L1) to winding (L6) are connected in series as alternated with diodes (D1) to (D5). The winding (L6) is connected by a diode (D6) to the first port of a first triac (T1).

Also, the winding (L7) to the winding (L12) are connected in series as alternated with diodes (D7) to (D11). The winding (L12) is connected by a diode (D12) to the first port of a second triac (T2).

The diodes (D1 to D12) are connected to condensing circuits (H1 to H12) respectively.

The first triac (T1) is turned on by the action of gate circuits (13, 14) when the polarity of magnetic flux detected by the Hall sensor (12) shifts from S to N. It is turned off when the polarity of magnetic flux detected by the Hall sensor (12) shifts from N to S.

On the other hand, the second triac (T2) is turned on by the action of the gate circuit (13) when the polarity of magnetic flux detected by the Hall sensor (12) shifts from N to S. It is turned off When the polarity of magnetic flux detected by the Hall sensor (12) shifts from S to N.

The second port of the first triac (T1) is connected to a capacitor (C) by a current-limiting resistor (R1).

The second port of the second triac (T2) is connected to the capacitor (C) by a current-limiting resistor (R2).

A direct current is output from both ends of the capacitor (C).

The action of the generator will b be described.

The driving shaft (1) is rotated in a clockwise direction in FIG. 2.

As the left rotator disk (5L) and the right rotator disk (5R) are rotated by the driving shaft (1), the polarity of magnetic flux detected by the Hall sensor (12) shifts from S to N. This turns the first triac (T1) on and the second triac (T2) off.

As the left rotator disk (5L) and the right rotator disk (5R) rotate more, an electromotive force is respectively generated in the winding (L1) to the winding (L6) at the forward direction of the diodes (D1) to the diodes (D6) thus to charge the condensing circuits (H1) to (H6). The voltages in the condensing circuits (H1) to (H6) are then summed. The capacitor (C) is then charged with a voltage output of the condensing circuit (H6) via the first triac (T1) and the current-limiting resistor (R1). In turn, the capacitor (C) releases a DC output from both ends. Meanwhile, an electromotive force is respectively generated in the winding (L7) to the winding (L12) at the reverse direction of the diodes (D7) to the diodes (D12). While the second triac (T2) remains turned off, these electromotive forces generated in the winding (L7) to the winding (L12) are not concerned with the DC output.

As the left rotator disk (5L) and the right rotator disk (5R) rotate further, the polarity of magnetic flux detected by the Hail sensor (12) is shifted from N to S. This causes the first triac (T1) to turn off and the second triac (T2) to turn on.

As the left rotator disk (5L) and the right rotator disk (5R) rotate furthermore, an electromotive force is respectively generated in the winding (L1) to the winding (L6) at the reverse direction of the diodes (D1) to the diodes (D6). While the first triac (T1) remains turned off these electromotive forces generated in the winding (L1) to the winding (L6) have no concern with the DC output. On the other hand, the winding (L7) to the winding (L12) respectively generates an electromotive force at the forward direction of the diodes (D7) to the diodes (D12) and the condensing circuits (H7) to (H12) are charged. The voltages in the condensing circuits (H7) to (H12) are then summed. The capacitor (C) is then charged with a voltage output of the condensing circuit (H12) via the second triac (T2) and the current-limiting resistor (R2). In turn, the capacitor (C) releases a DC output from both ends.

The generator (100) of the first embodiment has the left rotator disk (5L) and the right rotator disk (5R) arranged of a disk shape and reduced in the weight, thus improving the efficiency of the power generation. Also, the stator (10) is sandwiched between the left rotator disk (5L) and the right rotator disk (5R). And the left rotator disk (5L) and the right rotator disk (5R) are identical in the polarity at their opposite magnetic pole allocations. Accordingly, the electromotive forces generated in portions of the windings which face the magnetic poles of the left rotator disk (5L) and the electromotive forces generated in portions of the windings which face the magnetic poles of the right rotator disk (5R) can be additional direction, hence increasing the efficiency of the power generation. Moreover, the left rotator disk (5L) and the right rotator disk (5R) are arranged to the stator 10 like parallel planes, not like coaxial cylinders, thus improving the efficiency of heat radiation.

Second Embodiment

While the two rotator disks (5L) and (5R) are provided to sandwich the stator (10) in the first embodiment, one of them may be eliminated in the second embodiment.

Third Embodiment

While the two permanent magnets of substantially ½-circular shape are mounted to each rotator disk in the first embodiment, the number of 2k (k being an integer of two or greater) permanent magnets of substantially ½k-circular shape may be mounted to each rotator disk in the third embodiment. If N pole and S pole are shifted alternately at equal interval, it is not restricted that N pole magnet and S pole magnet are arranged alternately one by one. For example, four permanent magnets of substantially ¼-circular shape are arranged along the circumference to shift N pole and S pole alternately one by one, or at two consecutive N poles and two consecutive S poles. The latter case where two consecutive N pole magnets and two consecutive S pole magnets is equivalent to two ½-circular shape magnets arranged.

Alternatively, a single circular permanent magnet may be provided as magnetized at N and S alternately at equal intervals.

Assuming that the shift from S to N is counted m times by the Hall sensor (12) during one full revolution of the magnet pole face, a 2m number of windings (this one winding may be consisted by a plural of segment windings) may be provided on the ring core (1) as connected to their respective triac devices which can be turned on alternatively for producing outputs. For example, when four permanent magnets of substantially ¼-circular shape are provided along the circumference for shifting N pole and S pole alternately one by one, as m=2, this allows four windings to be provided on the ring core (1) and assigned to four triac devices which can be turned on alternatively for producing the output. Each of the windings may consist of three segment windings connected in series as alternated with diodes (where a total of twelve segment windings are mounted on the ring core (1)).

INDUSTRIAL APPLICABILITY

The generator of the present invention has the disk shape rotators. Thus, the efficiency of the power generation is improved because of the weight being reduced and so on. Also, since the permanent magnet rotators of a disk shape are arranged for facing to the stator like parallel planes, not like coaxial cylinders, thus increasing the efficiency of heat radiation.

What is claimed is:

1. A generator comprising: a driving shaft rotated by an external driving force; a first rotator disk mounted to the driving shaft and having a magnetic pole face thereof provided with N pole and S pole of permanent magnets; a second rotator disk mounted to the driving shaft to be distanced from the first rotator disk and having a magnetic pole face thereof provided with permanent magnets facing the magnetic pole face of the first rotator disk; a ring core; a first winding consisting of separate windings mounted adjacent to one another on a half of the circumference of the ring core; diodes connected in series with the separate windings and a diode connected in series with the last separate winding; a condensing circuit arranged to be charged with current which flows in the separate winding of the first windings and the diodes; a second winding consisting of separate windings mounted adjacent to one another on the remaining half of the circumference of the ring core; diodes connected in series with the separate windings in the order of allocation and a diode connected in series with the last separate winding; and a condensing circuit arranged to be charged with current which flows in the separate windings of the second winding and the diodes.

2. The generator according to claim 1, further comprising a rotational phase sensor for detecting the rotational phase of the driving shaft; and a switching circuit arranged responsive to the rotational phase detected by the rotational phase sensor for switching between releasing a current output from the first winding when the driving shaft rotates a half revolution and releasing of a current output from the second winding when the driving shaft rotates the other half revolution.

* * * * *